US012798978B2

(12) United States Patent
Kornmeyer et al.

(10) Patent No.: US 12,798,978 B2
(45) Date of Patent: Nov. 17, 2026

(54) METHOD FOR PRODUCING POROUS CARBON OR GRAPHITE

(71) Applicant: Nippon Kornmeyer Carbon Group GmbH, Windhagen (DE)

(72) Inventors: Torsten Kornmeyer, Königswinter (DE); David Klein, Hennef (DE)

(73) Assignee: Nippon Kornmeyer Carbon Group GmbH, Windhagen (DE)

(*) Notice: Subject to any disclaimer, the term of this patent is extended or adjusted under 35 U.S.C. 154(b) by 391 days.

(21) Appl. No.: 18/708,336

(22) PCT Filed: Nov. 14, 2022

(86) PCT No.: PCT/EP2022/081768
§ 371 (c)(1),
(2) Date: May 8, 2024

(87) PCT Pub. No.: WO2023/094199
PCT Pub. Date: Jun. 1, 2023

(65) Prior Publication Data

US 2024/0417265 A1 Dec. 19, 2024

(30) Foreign Application Priority Data

Nov. 23, 2021 (DE) ..................... 10 2021 130 581.0

(51) Int. Cl.
*C01B 32/205* (2017.01)
*C04B 35/565* (2006.01)

(52) U.S. Cl.
CPC .......... *C01B 32/205* (2017.08); *C04B 35/565* (2013.01); *C04B 2235/48* (2013.01); *C04B 2235/6581* (2013.01)

(58) Field of Classification Search
None
See application file for complete search history.

(56) References Cited

U.S. PATENT DOCUMENTS 9,353,013 B2 * 5/2016 Hinoki .................. C04B 35/575
12,030,779 B2 * 7/2024 Kornmeyer ................ C08J 9/36
(Continued)

FOREIGN PATENT DOCUMENTS

CN 108028267 A 5/2018
CN 112595159 A 4/2021
(Continued)

OTHER PUBLICATIONS

Li, Maoqun, et al. From starch to carbon materials: insight into the cross-linking reaction and its influence on the carbonization process. ACS sustainable chemistry & engineering, 2019, 7. Jg., Nr. 17, S. 14796-14804.
(Continued)

*Primary Examiner* — John J Figueroa
(74) *Attorney, Agent, or Firm* — Smartpat PLC

(57) ABSTRACT

A method for producing porous carbon or includes filling pulverised dry or dried wheat or rice starch into a mould/a container (1) as a compact mass (2); compressing/compacting the mass (2) in the mould/the container (1); initiating a shrinkage process by heating the mass (2) in the filled mould/container (1) in a kiln to a first temperature level of 170° C.-450° C. in an oxidising or inert atmosphere; stabilising the heated mass (2) over an extended period of time, then slowly heating the mass (2) further in the kiln in a heating ramp for carbonisation at a second temperature level to >1,000° C. or, for graphitisation, to >2,500° C. under shielding gas to form the most compact blank (5) possible; and removing the compact blank (5) from the mould/the container.

16 Claims, 3 Drawing Sheets

(56) References Cited

U.S. PATENT DOCUMENTS

| | | | | |
|---|---|---|---|---|
| 2004/0051196 | A1* | 3/2004 | Otsuka | C04B 35/62655 264/630 |
| 2012/0077020 | A1* | 3/2012 | Muramatsu | C01B 32/156 977/734 |
| 2012/0315482 | A1* | 12/2012 | Muramatsu | C04B 35/62281 977/734 |
| 2022/0219988 | A1* | 7/2022 | Fujiwara | C01B 32/05 |
| 2025/0019246 | A1* | 1/2025 | Kornmeyer | C01B 32/97 |

FOREIGN PATENT DOCUMENTS

| | | | |
|---|---|---|---|
| CN | 113620272 | A | 11/2021 |
| JP | S48018185 | | 3/1973 |
| JP | S59018183 | | 1/1984 |
| JP | H02083204 | | 3/1990 |
| JP | H10101453 | A | 4/1998 |
| JP | 2007145665 | A | 6/2007 |
| JP | 2008509876 | A | 4/2008 |
| WO | 2006023419 | A1 | 3/2006 |
| WO | 2020189632 | A1 | 9/2020 |

OTHER PUBLICATIONS

Preparation of carbon sphere from corn starch by a simple method, Authors: Zhao S, Wang C, Chen M, Shi Z, Publication data: Materials Letters,,Jul. 15, 2008, Elsevier, Amsterdam, NL, Source info: vol. 62, Nr: 19, pp. 3322-3324.

Preparation of carbon spheres from potato starch and its stabilization mechanism, Authors: Zhao S, Wang C y, Chen M m, Shi Z q, Liu N, Publication data: New Carbon Materials,,Dec. 1, 2010, Elsevier, Amsterdam, NL, Source info: vol. 25, Nr: 6, pp. 438-443.

* cited by examiner

METHOD FOR PRODUCING POROUS CARBON OR GRAPHITE

CROSS-REFERENCE TO RELATED APPLICATION

This application is a national stage application, filed under 35 U.S.C. § 371, of International Patent Application PCT/EP2022/081768, filed on Nov. 14, 2022, which claims the benefit of German Patent Application DE 10 2021 130 581.0, filed on Nov. 23, 2021.

TECHNICAL FIELD

The disclosure relates to a method for producing porous carbon or graphite with homogeneous and hard structure and suitable for machining for the production of moldings.

BACKGROUND

Carbon materials are commonly produced by the grinding of coke, carbon black or graphite until granules having a desired grain size, or powder, are reached. These granules cannot be reshaped by simple compression molding, and so the granules are admixed with a suitable binder, such as a thermoplastic. This mixture is subsequently homogenized and brought into a desired shape by compression molding. The molding produced accordingly, also referred to as a green compact, is lastly carbonized/graphitized in a kiln under a suitable atmosphere at high temperatures.

Subsequent to the carbonization/graphitization, machining may follow to produce a carbon or graphite component.

It will be appreciated that the production operation described is very elaborate and because of the starting materials used is fairly expensive.

Disclosed in CN 113 620 272 A is a method for producing graphite battery electrodes in which starch and carbon black are first mixed with one another mechanically and uniformly in a mandated ratio. The mixture is subsequently filled into a crucible and stabilized in a muffle kiln at 200-600° C. over 3-8 h. Finally, the mixture is carbonized at 800-1600° C. in a nitrogen atmosphere to generate carbon black-based carbon microspheres over 1-3 h, followed by cooling to room temperature.

SUMMARY

The object on which the invention is based is therefore that of creating a method which is simple to realize for the inexpensive production of porous carbon or graphite with homogeneous and hard structure from renewable raw materials that allows subsequent machining for production of any desired moldings for use as construction elements, casting molds or containers, which can be converted in a simple way into SiC moldings.

The object underlying the invention is achieved by method steps as follows:

- introduction of pulverized dry or dried wheat, corn, rice or other starch into a mold/container,
- generation of a compact mass in the mold/container by compression/compaction of the mass in the container by action of a uniform or impulsive pressure force on the mass,
- initiation of a contraction event by slow heating of the compact mass in the filled mold/container in a kiln to a first temperature level of 170° C.-450° C. in 5° C. steps in an oxidizing or inert atmosphere with further compression/compaction of the mass,
- stabilization of the blank over a prolonged period of >1 h,
- further slow heating of the blank in a kiln in a heating ramp of ~1° C./min for carbonization to a second temperature level at >1000° C. or for graphitization at >2500° C. under protective gas to form an extremely compact blank, and
- withdrawal of the compact blank from the mold/container.

The object underlying the invention is additionally achieved by the method steps of

- introduction of pulverized dry or dried wheat, corn, rice or other starch into a mold/container,
- generation of a compact mass in the mold/container by compression/compaction of the mass in the container by action of a uniform or impulsive pressure force on the mass,
- initiation of the contraction event by heating of the compact mass to an onset temperature of around 190° C., followed by a cooling event over a number of hours and renewed stageless heating of the compact mass to 210-230° C. with further compression/compaction of the mass,
- stabilization of the heated mass over a prolonged period of >1 h,
- further slow heating of the mass in the kiln in a heating ramp of ~1° C./min for carbonization to a second temperature level at >1000° C. or for graphitization at >2500° C. under protective gas to form an extremely compact blank, and
- withdrawal of the compact blank from the mold/container.

The slow heating to a first temperature level takes place preferably in 5° C. steps, with a waiting time between the steps of around 8 hours.

The wheat, corn or rice starch may also be admixed with sugar or a vegetable oil as binder.

In a further configuration, the mixture of wheat or rice starch is admixed with sugar or oil (edible oil) and/or further graphitizable materials as further extraneous substances.

Candidate graphitizable materials include, for example, high-temperature-resistant polymers, carbon black, graphite dust, natural graphite and/or PVA (polyvinyl alcohol) adhesive.

Lastly, natural fiber substances, such as cotton, pulp, bamboo, hemp, etc., may also be admixed.

In continuation of the invention, the compression/compaction of the mass filled into the mold/container takes place by generation of a uniform pressure force acting on the mass, e.g., by additional loading of a plate lying on the mass with weights, or by vibration (e.g., with a vibration plate or other vibrating facility) or shaking of the mold/container, or hard impulses, which act laterally or from below on the mass, e.g., by striking against the mold/container, to give a compact molding.

The compression/compaction of the mass may also take place during heating up, by loading with an onlying weight.

The heating ramp for the carbonizing/graphitizing ought to be ~1° C./min or less, and a pause of 30 to 120 minutes ought to be inserted for each 50° C. to 100° C. stage, allowing the material to relax and at the same time gases such as air or water vapor to diffuse out, without damaging the structure.

The specific choice of the heating ramp and heating stage is also dependent on the pressure during this event, and so heating may be carried out more rapidly at a higher pressure overall.

Candidate protective gases include the noble gases helium, neon, argon, krypton, xenon and radon.

The carbonizing/graphitizing is preferably performed at a pressure of >500 mbar.

A mold/container of Teflon (up to a temperature of not more than 250° C.) or another suitable material may preferably be used in order to allow the molding to be easily withdrawn; an alternative possibility is to line the mold/container with a cloth before the mass is introduced.

The blank 5 of graphite, produced in accordance with the invention may be converted readily into SiC in a kiln at a temperature of >1200° C. with supply of SiO and with argon as carrier gas at a pressure of 30 mbar, with a temperature of around 1520° C. being preferred.

The invention is elucidated in more detail below, using an exemplary embodiment.

DETAILED DESCRIPTION

Figure 1A:
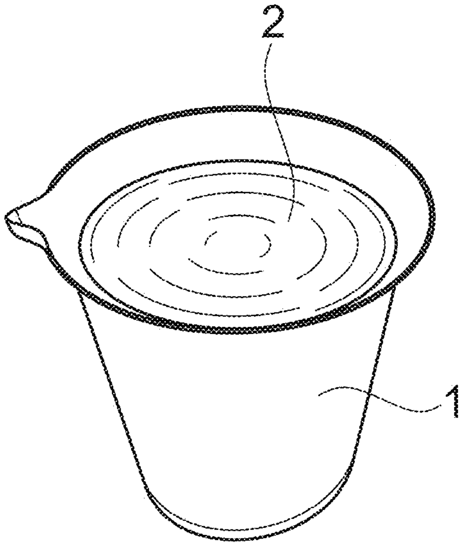
FIG. 1*a* shows a mold/container filled with a mixture of wheat starch and extraneous substances.

The method of the invention initially comprises steps as follows:

Introduction of pulverized/granulated dry or dried wheat or rice starch into a mold/container 1 as a compact mass 2, followed by a step of compaction of the mass 2 in the mold/container 1 (FIG. 1*a*). For this purpose, the mass 2 filled into the mold/container 1 is compacted by generation of a uniform pressure force acting on the mass 2, e.g., by additional loading of a plate lying on the mass 2 with weights, or by vibration (e.g., with a vibration plate or other vibrating facility) or shaking of the mold/container, or hard impulses, which act laterally or from below on the mass 2, e.g., by striking against the mold/container 1, to give a compact mass 2.

Alternatively, a binder may be admixed to the wheat or corn starch.

A particularly suitable binder for the production of the mixture is sugar or an oil, e.g., edible oil.

It is also possible for the wheat or rice starch mass 2 to be admixed with sugar or oil (edible oil) and/or further graphitizable materials.

Candidate further graphitizable materials include, for example, high-temperature-resistant polymers, carbon black, graphite dust, natural graphite and/or PVA (polyvinyl alcohol) adhesive.

Lastly, natural fiber substances, such as cotton, pulp, bamboo, hemp, etc., may also be admixed.

Figure 1B:
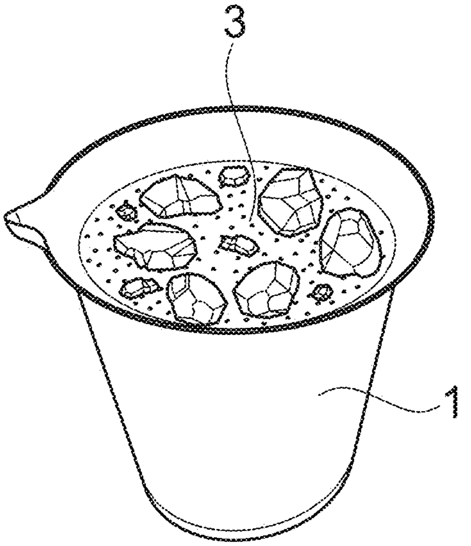
FIG. 1*b* shows the filled container after carbonization.
Figure 3:
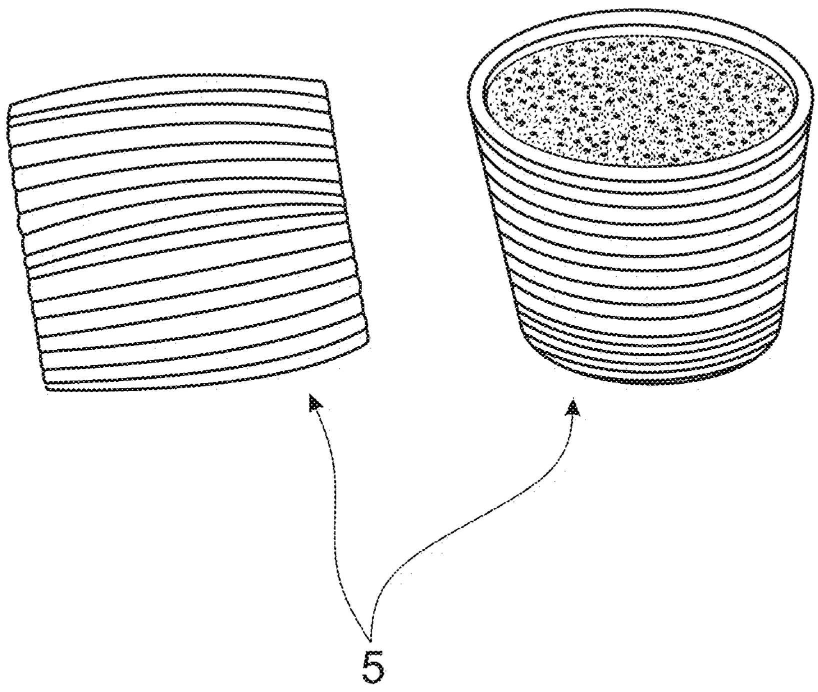
FIG. 3 shows a carbonized mass produced from wheat starch and sugar and edible oil as extraneous substance after the first heating to 250° C.

Subsequently, a contraction event is initiated by heating the compact or compacted mass 2 in the filled mold/container 1 in a kiln to a first temperature level of 170° C.-450° C. in an oxidizing or inert atmosphere or at >170° C. and stabilizing the mass 2 in the mold/container 1 over a prolonged period. In that case, the stabilization takes place over a period of >1 hour, depending on the amount of the mass 2. FIG. 1*b* shows the at least partly carbonized mass 3 after the first thermal treatment, and FIG. 3 shows various views of the at least partly carbonized mass 3 after withdrawal from the mold/container 1.

Alternatively, the contraction event may also be initiated by rapid heating of the compact mass 2 to an onset temperature of around 190° C., followed by a cooling event over a number of hours and renewed slow stageless heating of the compact mass to 210-230° C.

At the best, the contraction event may be initiated by slow heating in stages at ~180° C. and 230° C.

Figure 2:
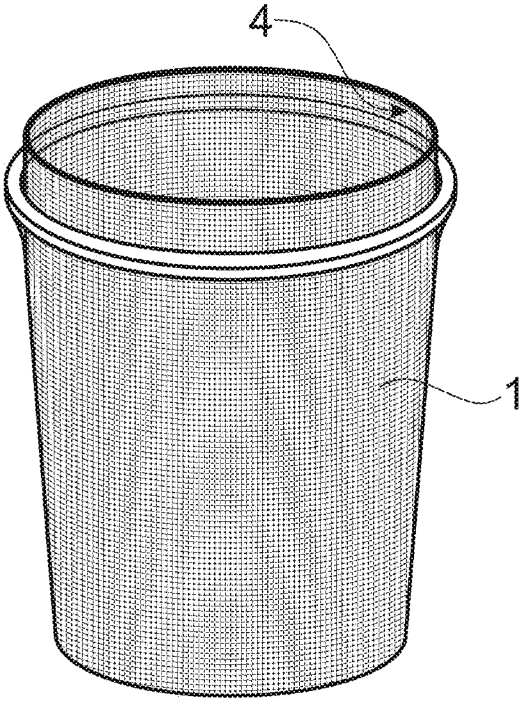
FIG. 2 shows a container lined with a cloth.

The mold/container 1 may consist of a temperature-resistant plastic polymer, or of another material, to allow the stabilized mass 3 to be easily withdrawn; an alternative possibility is to line the mold/container 1 with a cloth 4 before the mass is introduced (FIG. 2).

In a following step, the at least partly carbonized mass 3 is heated in the kiln in a heating ramp for carbonization to a second temperature level at >1000° C. or for graphitization at >2500° C. under protective gas to form an extremely compact blank 5, after which the blank 5 can be withdrawn from the mold/container 1. Candidate protective gases include the noble gases helium, neon, argon, krypton, xenon and radon. In principle, N2 may also be used.

It will be appreciated that the blank 5 may also be withdrawn from the mold/container 1 before the carbonization/graphitization and subjected to the thermal treatment in the kiln.

The heating ramp for the carbonizing or graphitizing of the blank 5 ought for example to be ~1° C./min or less, and a pause of ~30 to 120 minutes ought to be inserted for each 50° C. to 100° C. stage, allowing the material to relax and at the same time gases such as air or water vapor to diffuse out, without damaging the structure. The carbonizing/graphitizing is preferably performed at a pressure of >500 mbar.

It will be appreciated that different ramps may also come about, depending on the mass of the blank.

Figure 4:
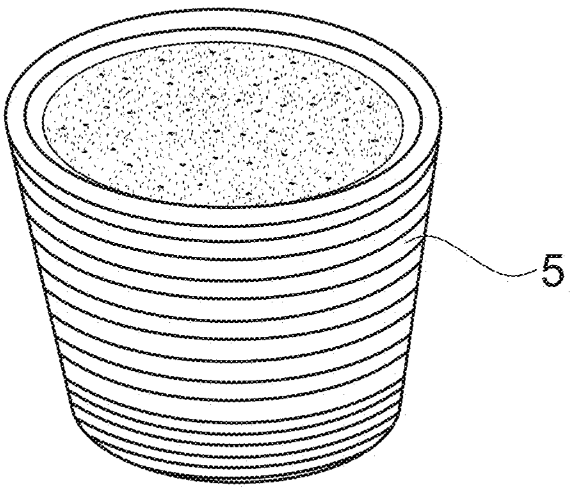
FIG. 4 shows the blank after 3 hours at 1600° C., heated up with a heating ramp of 1° C./min with a hold at 200° C., 400° C. and 500° C. for 120 minutes each time.

FIG. 4 shows the blank 5 after a thermal treatment at a final temperature of 1600° C. over around 3 hours with a heating ramp of 1° C./min with a hold at 200° C., 300° C., 400° C. and 500° C. for 120 minutes each time.

Figure 5:
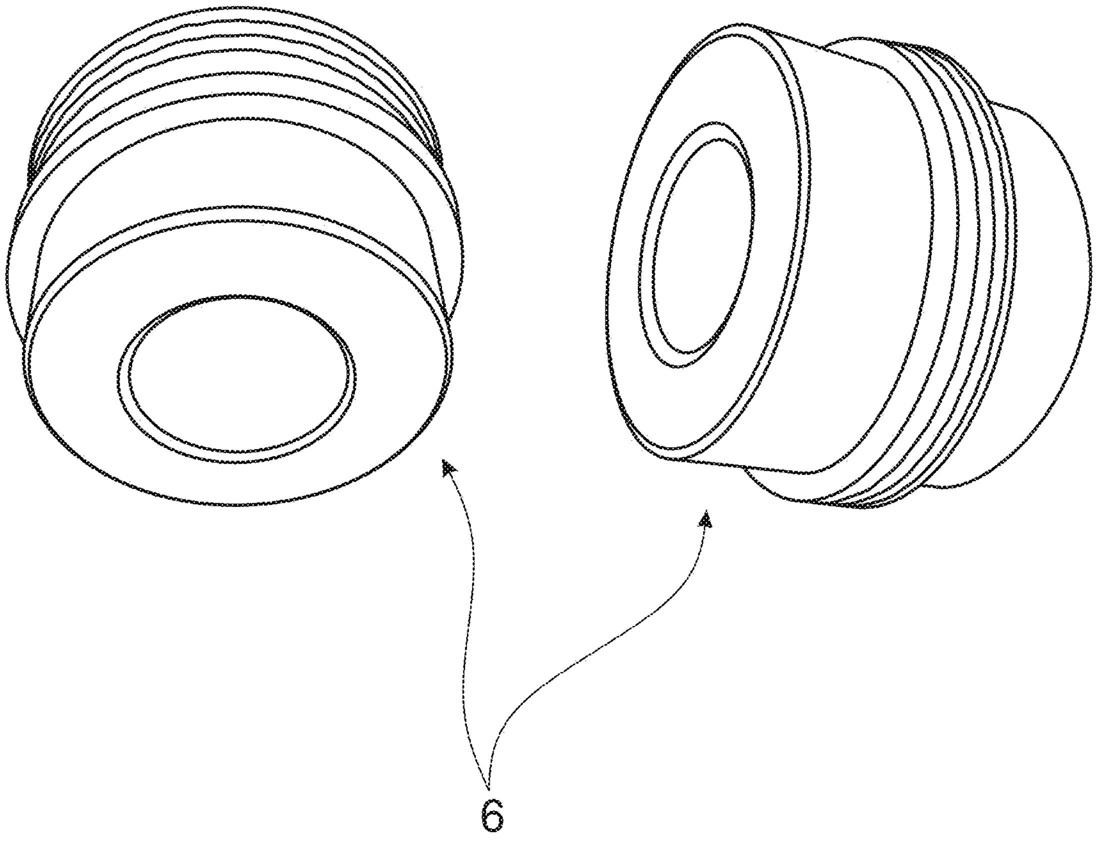
FIG. 5 shows the blank according to FIG. 4, completed as a molding, after the turning of both sides (outside and inside).

FIG. 5 shows the blank 5 according to FIG. 4, completed as a molding 6, after the machining of both sides (outside and inside) by turning.

The blank 5 of graphite, produced in accordance with the invention, can also be readily converted into SiC. Conversion into SiC may take place in a customary way in a kiln at a temperature of >1200° C. with supply of SiO and with argon as carrier gas at a pressure of 30 mbar. The temperature preferred for this operation is 1520° C.

Conversion into SiC may also be performed at a high pressure, such as 950 mbar. The pressure utilized at the time has an influence on the homogeneity and rate of the conversion.

In principle, it is also possible when carbonizing/graphitizing in the kiln to supply carbon-containing gas additionally as well, so that the molding 6 is additionally compacted.

LIST OF REFERENCE SIGNS

1 mold/container
2 compact mass
3 carbonized mass
4 cloth 5 blank
6 molding

The invention claimed is:

1. A method for producing porous carbon or graphite having a homogeneous and hard structure, comprising:
introducing starch that is pulverized and dry into a mold/container (1);
generating a compact mass (2) by compressing/compacting the starch (2) in the mold/container (1) by action of a uniform or impulsive pressure force on the starch (2);
initiating a contraction event
by heating the compact mass (2) in the mold/container (1) in a kiln to a first temperature level of 170° C.-450° C. in 5° C. steps in an oxidizing or inert atmosphere with further compression/compaction of the compact mass (2) or
by heating the compact mass (2) to an onset temperature of 190° C., followed by a cooling event over a period of >1 h and renewed stageless heating of the compact mass (2) to 210-230° C. with further compressing/compacting of the compact mass (2);
stabilizing the heated compact mass (2) over a period of >1 h;
further slow heating the compact mass (2) in the kiln with a heating ramp of 1° C./min for carbonizing to a second temperature level at >1000° C. or for graphitizing at >2500° C. under protective gas to form a compact blank (5); and
withdrawing the compact blank (5) from the mold/container.

2. The method as claimed in claim 1, wherein the starch is wheat starch, corn starch, or rice starch.

3. The method as claimed in claim 1,
wherein the starch is wheat starch, or rice starch, and
wherein the method further comprises admixing sugar or an oil as binder to the wheat starch or the rice starch.

4. The method as claimed in claim 1, further comprising admixing further graphitizable materials to the starch.

5. The method as claimed in claim 4,
wherein the further graphitizable materials are high-temperature-resistant polymers, carbon black, graphite dust, natural graphite, and/or polyvinyl alcohol.

6. The method as claimed in claim 1, further comprising admixing natural fiber materials to the starch.

7. The method as claimed in claim 1,
wherein the starch is wheat starch, or corn starch, and
wherein the method further comprises admixing cotton, pulp, bamboo, hemp to the wheat starch or corn starch.

8. The method as claimed in claim 1,
wherein compressing/compacting the starch (2) filled into the mold/container (1) is performed
by generating a uniform pressure force acting on the starch (2) by additional loading of a plate lying on the starch (2) with weights, or
by vibrating or shaking the mold/container (1), or
by hard impulses which act laterally or from below on the starch (2) by striking against the mold/container (1).

9. The method as claimed in claim 1, wherein further slow heating the compact mass (2) is performed in stages, with insertion of a pause of 30 to 120 minutes for each 50° C. to 100° C. stage.

10. The method as claimed in claim 1, wherein the protective gas is helium, neon, argon, krypton, xenon or radon.

11. The method as claimed in claim 1, wherein the carbonizing or the graphitizing is performed at a pressure of >500 mbar.

12. The method as claimed in claim 1, wherein the mold/container (1) is made of Teflon, and wherein the method further comprises lining the mold/container (1) is lined with a cloth (4) before introducing the starch.

13. The method as claimed in claim 1, further comprising converting the compact blank (5) in the kiln or in a further kiln into SiC at a temperature of >1200° C. with supply of SiO and with argon as carrier gas at a pressure of 30 mbar.

14. The method as claimed in claim 13, wherein the converting into SiC takes place at a temperature of 1520° C.

15. A method for producing porous carbon or graphite having a homogeneous and hard structure, comprising:
introducing starch that is pulverized and dry into a mold/container (1);
generating a compact mass (2) by compressing/compacting the starch (2) in the mold/container (1) by action of a uniform or impulsive pressure force on the starch (2);
initiating a contraction event by heating the compact mass (2) in the mold/container (1) in a kiln to a first temperature level of 170° C.-450° C. in 5° C. steps in an oxidizing or inert atmosphere with further compression/compaction of the compact mass (2)
stabilizing the heated compact mass (2) over a period of >1 h;
further slow heating the compact mass (2) in the kiln with a heating ramp of 1° C./min for carbonizing to a second temperature level at >1000° C. or for graphitizing at >2500° C. under protective gas to form a compact blank (5); and
withdrawing the compact blank (5) from the mold/container.

16. A method for producing porous carbon or graphite having a homogeneous and hard structure, comprising:
introducing starch that is pulverized and dry into a mold/container (1);
generating a compact mass (2) by compressing/compacting the starch (2) in the mold/container (1) by action of a uniform or impulsive pressure force on the starch (2);
initiating a contraction event by heating the compact mass (2) to an onset temperature of 190° C., followed by a cooling event over a period of >1 h and renewed stageless heating of the compact mass (2) to 210-230° C. with further compressing/compacting of the compact mass (2);
stabilizing the heated compact mass (2) over a period of >1 h;
further slow heating the compact mass (2) in the kiln with a heating ramp of 1° C./min for carbonizing to a second temperature level at >1000° C. or for graphitizing at >2500° C. under protective gas to form a compact blank (5); and
withdrawing the compact blank (5) from the mold/container.

* * * * *